United States Patent [19]
Laakaniemi et al.

[11] 3,835,876
[45] Sept. 17, 1974

[54] FLUID SIGNAL LIMITING DEVICE

[75] Inventors: Richard N. Laakaniemi; Robert R. Stahl, both of Milwaukee, Wis.

[73] Assignee: Johnson Service Company, Milwaukee, Wis.

[22] Filed: Nov. 18, 1971

[21] Appl. No.: 199,893

[52] U.S. Cl. ............................ 137/82, 235/201 ME
[51] Int. Cl. ............................................ G05d 16/00
[58] Field of Search ................ 137/82; 235/201 ME; 251/61.1

[56] References Cited
UNITED STATES PATENTS

| | | | |
|---|---|---|---|
| 3,504,692 | 4/1970 | Goldstein | 235/201 ME |
| 3,347,252 | 10/1967 | Hanson | 137/82 |
| 3,324,870 | 6/1967 | Guerin | 137/82 |
| 3,540,477 | 11/1970 | Hogel | 235/201 ME |

*Primary Examiner*—Alan Cohan
*Attorney, Agent, or Firm*—Andrus, Sceales, Starke & Sawall

[57] ABSTRACT

A pneumatic signal limiter includes an integrated fluidic repeater and variable restrictor assembly having a pair of telescoping interconnected input and output body members with opposing and complementary recessed faces defining an input chamber and an output chamber to opposite sides of a diaphragm. The output portion includes an exhaust orifice and passageway within which a variable low limit restrictor is mounted to control the exhaust flow. The output body further includes an output passageway and intersecting exhaust passageway with an adjustable high limit restrictor connected directly to the exhaust passageway. The supply is connected to the output passageway in series with a restrictor through the intersecting passageway or a separate connection. Each restrictor is a needle valve which is adjustably secured within the housing with a conical point within a related limiter orifice. The threaded pin valve member has a relatively small cone angle and very fine adjusting threads. A closed loop control system includes a controller connected to sensors from a controlled variable source and from a master variable source through limiters. The controller is connected via a limiter to a control apparatus for the controlled variable unit.

7 Claims, 3 Drawing Figures

PATENTED SEP 17 1974  3,835,876
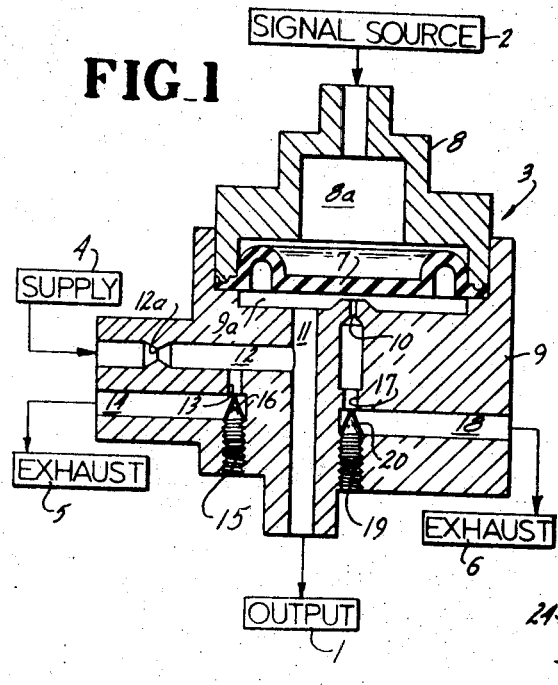
FIG.1
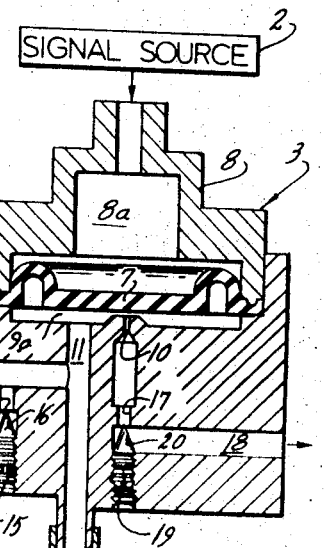
FIG.2
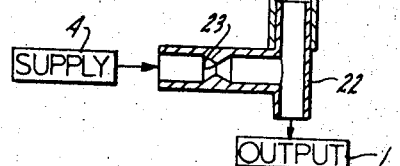
FIG.3
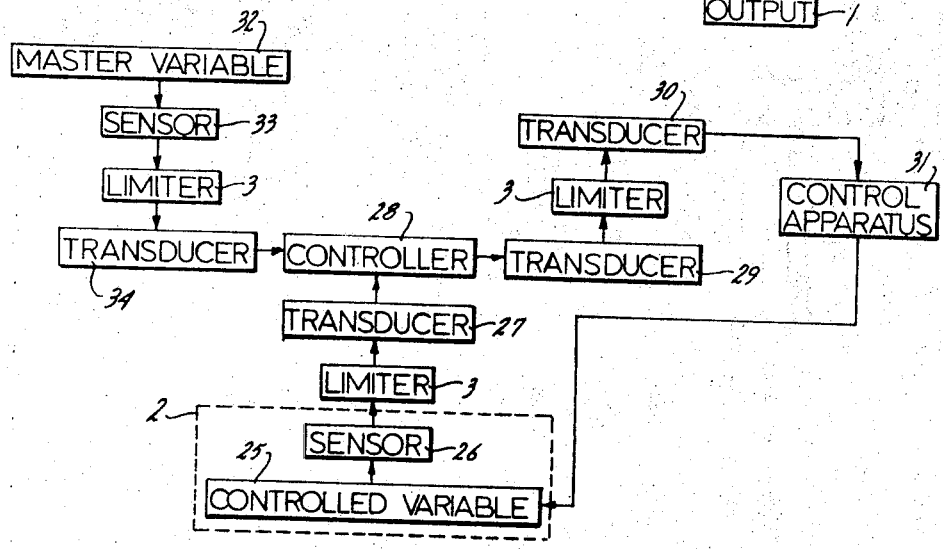

FLUID SIGNAL LIMITING DEVICE

BACKGROUND OF THE INVENTION

This invention relates to a fluid signal limiting device or apparatus and particularly to such a device which modifies a pneumatic or other fluid signal by establishing a high and/or low limit response to the signal.

In control systems, a fluid signal such as a pneumatic signal may control power transfer through the system. Many such systems may require an upper and/or lower limit of response. Thus, heating and cooling processes may advantageously incorporate upper and lower limits on the operating temperatures of the fluid exchange medium for various reasons. For example, it may be desirable to limit readjustment of the boiler water temperature in a heating system as a function of the outdoor air temperature. The outdoor air temperature can be readily detected through a suitable temperature element and transmitted as a pneumatic signal as an input control. The controlling apparatus must then provide the desired high and low limit response. Similarly, it may be desirable to establish a lower limit on the temperature of the chilled air delivered to a room in order to prevent undesirable discomfort to the room occupants associated with otherwise highly chilled air. Similar high and low limitations on control signals derived from variable pressures, temperatures and/or flows, either locally or in remote locations, may be required in overall control systems employing central controllers, computers and the like. Although restrictor and fluid resistance networks of various types have been suggested, they generally employ voltage or pressure dividing networks and the like with flow characteristics which affect the sensitivity of the controller. Furthermore, the response characteristics are such that the changes in the sensitivity are non-linear with the adjustment. The problem becomes particularly severe where the sensing means is a hydraulic bulb, a fluidic temperature sensing device and the like which presents unique problems in attempts to limit the input level.

SUMMARY OF THE PRESENT INVENTION

The present invention is particularly directed to a fluidic device which receives a fluidic input signal and establishes a related fluid output signal with accurately controlled high and/or low limits. Generally, in accordance with the present invention, the signal input is connected to the input chamber of a diaphragm type fluid repeater which input chamber is otherwise closed and deadends the signal source. The fluid output is connected to the output chamber of the fluid repeater which is also connected to a fluid supply through a fixed supply restrictor. The fluid repeater includes a movable diaphragm positioned with respect to an orifice as a result of and until the input signal balances the output supply pressure in the output chamber and thus provides a direct one-to-one transduction or duplication of the input pressure signal. The output flow is taken downstream of the fixed supply restrictor. In accordance with the present invention, a high limit variable restrictor is introduced and connects the downstream side of the fixed supply restrictor to an exhaust or reference pressure. Similarly, the output of the orifice is connected to a reference or exhaust means with a low limit variable restrictor in the interconnecting passageway. In calibrating the system, an input signal equal to or greater than the maximum desired output signal is established. The high limit variable restrictor is then adjusted to exhaust the main restricted supply until the maximum output pressure is established. This essentially cuts off the exhaust through the orifice.

The low limit is adjusted by establishing an input signal equal to or less than the lower limit desired. The low limit variable restrictor is then adjusted until the output pressure increases to the desired low limit.

The system, thus adjusted, provides for the maximum output pressure when the input signal rises to the maximum level be assuring exhaust at maximum pressure when the output pressure tends to rise above the maximum desired. The lower limit is adjusted by limiting the air that the repeater unit can exhaust.

Between the higher and lower limits the repeater functions in accordance with a conventional concept of adjusting the position of the diaphragm with respect to the exhaust orifice to increase and decrease the pressure accordingly. The output pressure thus changes directly in accordance with the change in the input pressure until a new balance condition is established when the output pressure will equal the input pressure.

In a particularly satisfactory construction the limiter is formed as an integrated fluidic repeater and variable restrictor assembly having a pair of telescoping interconnected body members having opposing and complementary recessed faces defining the input and output chambers. The diaphragm unit is clamped between the two body portions to form a common wall between the input chamber and the output chamber. The output chamber body portion includes the exhaust orifice and passageway within which a variable restrictor is mounted to control the exhaust flow. The output chamber body further includes an output passageway and intersecting exhaust passageway with an adjustable restrictor connected directly to the exhaust passageway. The supply is connected to the output passageway in series with a fixed restrictor through the intersecting passageway or a separate connection. Each variable restrictor is, in a particularly satisfactory construction, a needle or pin valve which is adjustably secured within the housing with a conical point within a limiter orifice. A threaded pin valve having a relatively small cone angle and very fine adjusting thread provides high resolution for accurately establishing a control related to the pin rotation per flow change. A pin valve may also be small and compact and thus particularly suited to fluidic control systems.

Applicants have discovered that the present invention provides a reliable and accurate means of setting a high and/or low limit on the output of the signal without altering the sensitivity or set point of the control system as it operates between such limits. The response and characteristic of the limiter is such that it will permit the utilization of standard controllers in non-standard control installations. Thus, a very high sensitivity controller in combination with the limiter will produce the desired response in applications heretofore requiring relatively low sensitivity controllers to avoid exceeding of high and low limits.

The limiter of the invention can be employed in an input line or an output line of a control system for controlling input signal response to any desired condition, movement or the like. The limiting control may also be inserted to maintain operation within a linear control range as well as in combination with a high controller sensitivity to create particular outputs such as oscillatory, digital or rapid on and off control output and the like. The insertion of the limiter in the output of the controller as such also adpats the system for and permits use of sensing control inputs which otherwise cannot be readily limited such as hydraulic bulbs, fluidic temperature sensing restrictors and the like. The device can, of course, also be used with a transducer to accept hydraulic, electric, electronic and other similar signals to convert them to fluid signals, and then establish their limits and then directly control the output or be reconverted into the control power mode.

The present invention thus provides a simple reliable fluid signal limiting device providing independent adjustment of the upper and lower limits to be introduced into the system without varying the sensitivity which of course can be separately adjusted in any well-known means.

BRIEF DESCRIPTION OF THE DRAWINGS

The drawing furnished herewith illustrates the preferred construction of the present invention in which the above advantages and features are clearly disclosed as well as others which will be readily understood from the following description of the illustrated embodiments of the invention.

In the drawing:

FIG. 1 is a cross-sectional view of a signal limiter constructed in accordance with the present invention and interconnecting a signal source to control the fluid output to a load device;

FIG. 2 is a view similar to FIG. 1 showing a modification of the system for a remote supply and output with respect to the signal source and FIG. 3 is a generalized control system including a controlled variable source and a master variable source interconnected to a controller to complete a closed loop control.

DESCRIPTION OF ILLUSTRATED EMBODIMENTS

Referring to the drawing and particularly to FIG. 1, the present invention is illustrated in a system wherein the fluid supply pressure to an output or load 1 is to be controlled in accordance with the fluid signal output of a signal source 2. In accordance with the present invention, a fluid signal limiter 2 interconnects the load 1 to a main supply 4, with the pressure signal established at the load 1 controlled by the signal source 2 between upper and lower pressure limits. The system is preferably a pneumatic signal limiter which modifies a pneumatic input signal by placing a high and a low limit on the effectiveness of the signal. The output is also a pneumatic signal which can be directly applied in a pneumatic system or through suitable transduction into any other control concept. Further, although the supply 4 and the signal source 2 are preferably air any other suitable fluid can of course be employed.

The output pressure limit is determined by controlling the exhaust of the air from the supply 4 directly via a high limit exhaust 5 and through the setting of the exhaust via the signal repeater 3 to a low limit exhaust 6.

The repeater includes a diaphragm 7 clamped between an input chamber body member 8 and an output chamber body member 9. The input and output chamber members 8 and 9 have opposed recesses which with the diaphragm 7 constituting a common wall therebetween complete the respective chambers 8a and 9a. The illustrated signal repeater 3 preferably incorporates the convoluted diaphragm disclosed in the copending application of Atkinson et al., Ser. No. 90,707 filed Nov. 18, 1970 in the United States Patent Office, entitled "Fluid Diaphragm Modulator" and assigned to the same assignee as the present application. The member 8 includes a passage connected to the signal source 2 to subject the one side of the diaphragm 7 to the input signal pressure from the signal source 2. The body member 9 includes an exhaust orifice 10 coaxially aligned with the diaphragm 7 such that the exhaust from the output chamber through the orifice 10 is controlled by the positioning of the diaphragm 7. The orifice 10 is preferably formed with a planar top face, with the diaphragm 7 maintained in parallel relationship thereto. The diaphragm 7 is, of course, urged to close the orifice 10 by the input signal pressure. This is opposed by the output pressure supplied to the opposite side of the diaphragm 7 via an output passageway 11 extending through the member 9. The passageway 11 is also connected to the supply 4 through a supply passageway 12 including an integral fixed restrictor 12a, shown as a conical inward projection within the supply passageway. The supply 4 is a suitable regulated air supply such that with a fixed pressure drop across the restrictor 12a, a predetermined maximum pressure is established in the supply line 12. The supply passageway 12 in accordance with the present invention is connected via a limiter orifice 13 to an exhaust passageway 14 which is connected to the exhaust 5. The orifice 13 is coupled to the supply passageway 12 downstream of the dropping restrictor 12a. A pin valve member 15 is threaded into the housing member 9 and includes a cone shaped tip 16 coaxially movable into the opening of orifice 13. The cone tip is made with a very small cone angle and preferably of the order of ten degrees (10°) or less for a restricted limiter valve opening of 0.063 inches or less. Further, the pin 15 is threaded with fine adjusting threads preferably of the order of 64 or more threads per inch. This results in a relatively high resolution in the pin valve adjustment with very accurate determination of flow changes per revolution of the pin valve member 15. The positioning of the cone shaped tip 16 into the orifice 13 of course varies the restriction to flow through the orifice 13 and constitutes a high limit output adjustment. Thus, with a signal input to the input chamber 8a equal to or in excess of the desired high limit on the input signal soruce 2, the high limit adjusting screw can be adjusted to exhaust sufficient flow to cause the diaphragm 7 to engage the face of the orifice 10 and completely close off the orifice 10. The high limit adjustment screw 15 is then further adjusted to position the cone tip 16 within the orifice 13 until the output pressure decreases to the desired high limit. The high limit screw 15 is now set so as to exhaust the required amount of the restricted supply air from the supply 4 to establish the maximum output pressure.

The lower limit is controlled by adjustment of a variable restrictor in a connection between the orifice 10 and the exhaust 6. Thus, an L-shaped passageway 18 connects the orifice 10 to exhaust 6 and includes an orifice or opening 17 at the junction to the laterally extending portion of passageway 18. A needle valve member 19, corresponding to member 15, is threaded into the housing coaxially of the orifice 17 and includes a cone tip 20 correspondingly coaxially positioned within the orifice 17.

After adjustment of the high limit, the input pressure signal in the chamber 8a is adjusted to a pressure equal to or less than the lower limit. The low limit adjustment pin valve 19 is then adjusted to selectively close the orifice 17 until the output pressure increases to the desired low limit. The effect is to limit the amount of air that the repeater 3 can exhaust and thereby establish the minimum output pressure for the given pressure of supply 4.

When the apparatus is thus interconnected to the signal source 2, the maximum and minimum output pressures will be established for corresponding maximum and minimum input signal pressures.

When the signal source 2 establishes an input pressure between such high and low limits, the instrument functions as the conventional repeater with the output pressure established in the output chamber 9a and thus in passageway 11 being a duplicate of the pressure in the input chamber 8a, as follows.

As the signal source pressure changes, an imbalance in pressure is created across the diaphragm 7. This results in movement of the diaphragm 7 toward or away from the exhaust orifice 10, depending upon the relative imbalance condition. If the diaphragm movement is toward the orifice 10, it will restrict the exhaust flow and thus increase the output pressure. Conversely, if the diaphragm movement is away from the orifice 10, as a result for example of a decrease in the input signal pressure, it will permit a greater exhausting of the supply via orifice 10 thereby decreasing the output signal. The output pressure thus changes in the same direction as the input pressure until a new orifice to diaphragm distance is established. At that point a balanced condition is again created across the diaphragm 7, with the output pressure equal to the input pressure.

The embodiment of the invention illustrated in FIG. 1 is particularly adapted to a local supply 4. Under certain instances the signal source 2 and the supply 4 may more conveniently be separated from each other by a significant distance. In such cases, the apparatus of FIG. 1 may be modified to provide for a remote output and supply, for example, as shown in FIG. 2. The limiter 3 is basically constructed in the same manner as that shown in FIG. 1 and consequently corresponding elements are correspondingly numbered for simplicity and clarity of explanation.

In the embodiment of FIG. 2, the supply 4 is spaced from the signal source 2. A coupling line 21 interconnects the output passageway 11 of the limiter 3 and a supply output coupling member 22, for interconnecting the supply and the output of the limiter 3. The supply 4 is connected via a fixed restrictor 23 in a lateral passageway of the member 22. The supply passageway 12 of the limiter 3 is capped as at 24 to effectively remove such passageway from the apparatus.

The limiter 3 of FIG. 2 essentially functions in the same manner as the limiter 3 of FIG. 1. The downstream side of the fixed supply restrictor 23 is connected to the output 1 and also via the member 22 and connecting tube 21 to passageways 11 and 12. The supply and output are thus connected to the high limit exhaust passageway or orifice 13 and through the output chamber and the orifice 10 to the low limit exhaust orifice 17. This system is adjusted for the high and low limits in the same manner as previously described.

The signal limiter such as disclosed in a preferred construction in FIGS. 1 and 2 can be employed in essentially any input or output line of a control system. A generalized control system is shown in FIG. 3 employing three limiters connected respectively between a pair of input lines and an output line. In FIG. 3, a controlled variable 25 constitutes the input portion of the signal source 2, the output of which is shown connected to a sensor 26 to detect the condition or position of the controlled variable and establish a pneumatic output signal related directly thereto. Thus, the sensor 26 is any suitable device such a transmitter, a thermostat or other transducing device which will convert the controlled variable such as temperature, humidity, flow, electrical voltage, electrical resistance or the like into a corresponding related pneumatic pressure.

If the controlled variable 25 is a pneumatic pressure falling within the range employed by the controller 28, the sensor element 26 can of course be eliminated and the output of the controlled variable unit connected directly as the input signal to the related limiter 3.

In FIG. 3, a transducer 27 connects the output of the limiter 3 to the input of a controller 28. The transducer 27 is similarly only required if the pneumatic output of the limiter 3 must be changed to some other energy form because of the controller design. Thus if the controller 28 is an electronic device the pneumatic output signal would be converted into a corresponding electrical signal. The limiter 3 would then provide the direct conversion of the input signal into a related output signal with the high and/or low limit control as disclosed in FIGS. 1 and 2 or any other corresponding limiter constructed in accordance with the teaching of the present invention.

The output of the controller 28 is shown connected via a transducer 29 as the input to a limiter 3 the output of which is connected via a transducer 30 to produce a related input signal to a control apparatus 31. The controlled variable 25 is controlled by the output of the control apparatus 31 in accordance with any predetermined design. The transducers 29 and 30 are illustrated once again to indicate the conversion to and from the pneumatic signal desired or required because of other design factors and requirements.

The generalized controlling unit of FIG. 3 also includes a master variable 32 which, in accordance with general design function, is employed to adjust the set point at which the controlled variable is to be maintained. It is shown connected as an input to the controller through a sensor 33, a limiter 3 and transducer 34 for the same reason as heretofore discussed with respect to the output of the controlled variable.

The controller 28 in accordance with known design is constructed to provide the desired summing, amplification, integration and/or differentiation of the inputs. Although a single pair of inputs are shown, any desired number can of course be supplied to produce the desired interrelated control with the output connected to the control apparatus.

Each of the inputs could of course include a plurality of inputs having individual sensing transducing and limiting elements in the system. Further the output of a signal sensor can be connected to a plurality of controllers and of course a single controller can be interconnected to any number of different control devices.

This system further permits desired interrelated control between the several inputs. Thus the range of the output of the master variable which can effectively reset or change the operation of the controller can be limited to maximum and minimum master variable signals. Similarly, the effect of the controlled variable can of course be fed to different controllers. Thus one may require a high limit and the other a low limit.

Where an integral sensor is employed as an integral part of the controller the input limiter cannot of course be normally introduced into the system. However, the output limits can be introduced. When limitation of the controlled variable is desired, however, a change in the controller will then be required.

Although the control system can be employed to control any process or any particular application including a variable condition to be sensed, the system can advantageously be applied to environmental control systems. For example, the boiler water temperature of a hot water heating system can be readjusted as a function of outdoor air temperature, with high and low limits on the adjustment in order to prevent undesirable operating conditions. Similarly, the lower limit on the temperature of the chilled air delivered to a room can be limited in order to prevent uncomfortable air temperatures being introduced. In environmental conditioning systems, it may be desirable to introduce a minimum ventilation level through the use of the low limit in one branch of the controller output while other branches can, of course, deliver pressures below such low limit. Similarly, gas flow can be controlled by use of one or two controlled variable limiters to establish a differential signal which is fed to the controller through a pair of signal paths. The above are general typical applications for the present invention.

Various modes of carrying out the invention are contemplated as being within the scope of the following claims, particularly pointing out and distinctly claiming the subject matter which is regarded as the invention.

We claim:

1. A fluid signal processing system comprising, a fluid repeater including an input chamber means and an output chamber means separated by a common movable wall and an exhaust orifice means terminating in the output chamber means in opposed relation to said common movable wall and extending outwardly from said output chamber means, an output passageway means connected to said output chamber means, a first exhaust passageway means connected to said output passageway means for continuously exhausting flow therefrom, a high limit pressure restrictor in said first exhaust passageway means to establish an upper pressure limit essentially independent of the flow through the exhaust orifice means, a second exhaust passageway means connected to said exhaust orifice means downstream of said output chamber means for continuously exhausting flow therefrom, and a low limit pressure restrictor in said second exhaust passageway means to control the flow from said orifice means and establishing a low pressure limit independent from the flow through the upper pressure limit restrictor.

2. The fluid signal processing system of claim 1 having a supply passageway means including a fixed supply restrictor connected to said output passageway means.

3. The fluid signal processing system of claim 1 having a supply passageway means including a fixed supply restrictor connected to said first exhaust passageway means upstream of said high limit pressure restrictor.

4. The fluid signal processing system of claim 1 wherein said high limit pressure restrictor and low limit pressure restrictor are needle valve units having conical needle members with an included cone angle which is no greater than the order of ten degrees.

5. The fluid signal processing system of claim 1 wherein said fluid repeater includes a body member having said output chamber means formed in one surface, a T-shaped passageway in said body member having one end connected to said output chamber means and defining said output passageway means and said first exhaust passageway means, said high limit pressure restrictor including an orifice connected to said first exhaust passageway means and a needle valve stem having a conical valve tip coaxially aligned with said orifice, said valve stem being threaded into said body member to selectively position the tip in said orifice, said second exhaust passageway means being L-shaped and having a low limit orifice at the corner junction of the L-shape, said low limit pressure restrictor including said low limit orifice and a needle valve stem having a conical valve tip coaxially aligned with said orifice, said low limit valve stem being threaded into said body member to selectively position the tip in said orifice.

6. The fluid signal processing system of claim 1 wherein said fluid repeater includes a body member having said output chamber formed in one surface with a coaxially located orifice, a T-shaped passageway in said body member including a cross bar defining said output passageway means and a stem defining a supply passageway means, a fixed restrictor in the supply passageway means, said high limit reference pressure passageway means extending parallel to said supply passageway means and coupled thereto by an orifice downstream of said fixed restrictor, said high limit pressure restrictor including a needle valve stem threaded into said body member and having a conical valve tip coaxially aligned with and projecting into said orifice, said valve stem being threaded into said body member to selectively position the tip in said orifice.

7. The fluid signal processing system of claim 6 having said second exhaust passageway means defined by an L-shaped passageway extending from said exhaust orifice, said low pressure restrictor being located in the L-shaped passageway in alignment with the exhaust orifice and a needle valve stem threaded into said body member and having a conical valve tip coaxially aligned with the low limit orifice and projecting into said low limit orifice.

* * * * *

UNITED STATES PATENT OFFICE
CERTIFICATE OF CORRECTION

Patent No. 3,835,876      Dated September 17, 1974

Inventor(s) RICHARD N. LAAKANIEMI and ROBERT R. STAHL

It is certified that error appears in the above-identified patent and that said Letters Patent are hereby corrected as shown below:

Column 8, Line 40, (Claim 6)    after "said" cancel "high limit reference pressure" and insert --- first exhaust ---.

Signed and sealed this 7th day of January 1975.

(SEAL)
Attest:

McCOY M. GIBSON JR.
Attesting Officer

C. MARSHALL DANN
Commissioner of Patents